Oct. 25, 1927.

A. S. MACDONALD 1,647,114

FLEXIBLE TORQUE TRANSMITTING MEMBER

Filed Oct. 17, 1922

WITNESS
Gustav Genzlinger

INVENTOR
Angus S. Macdonald
BY
ATTORNEYS

Patented Oct. 25, 1927.

1,647,114

UNITED STATES PATENT OFFICE.

ANGUS S. MACDONALD, OF GREAT NECK, NEW YORK, ASSIGNOR, BY MESNE ASSIGNMENTS, TO SPICER MANUFACTURING CORPORATION, OF SOUTH PLAINFIELD, NEW JERSEY, A CORPORATION OF VIRGINIA.

FLEXIBLE TORQUE-TRANSMITTING MEMBER.

Application filed October 17, 1922. Serial No. 595,040.

My invention relates to flexible torque transmitting members or discs suitable for flexible joints of the general Daimler type, such as are used in automotive drive assemblies. Such a joint usually consists of angularly offset spider members secured to adjacent ends of driving and driven shafting, together with one or more flexible members each comprising one or more discs or laminæ interposed between the spiders and connected to them in alternation (at intervals), by means of bolts. Very commonly, the spiders have feet for clamping the discs and taking the securing and clamping bolts, and clamping washers are "strung" on the bolts between the washers.

Heretofore, the discs have been composed of layers of rubberized fabric vulcanized together. One of the chief difficulties incident to this construction has been that the warp and weft threads of the fabric bear on each other at the crossing point for the reason that while it is possible to provide an insulating thickness of rubber between the respective layers, it is impossible to provide such an insulating thickness between the crossing threads of a layer. During flexure of the discs, therefore, the crossing threads continually rub upon each other so that in course of time the threads cut through and the discs fail. Joints of this character are very extensively used in automotive drive shaft assemblies in which the driven shaft has marked angularity with respect to the driving shaft, which results in considerable flexure of the discs during rotation. The life of the joints is, therefore, very seriously affected by the cutting action of the threads, one upon the other.

The primary object of my invention is to overcome the difficulties noted and to provide a disc of superior strength and greater life and which, at the same time, shall not be unduly expensive or difficult to manufacture or assemble in a joint.

How these and other advantages can be realized through my invention will appear from my description hereinafter of the best embodiments of the invention known to me.

In the drawings, Figs. 1, 2 and 3 are side views of flexible members embodying my invention, the layers or laminæ of each being partially cut or broken away to reveal their relative arrangement.

Figure 1:
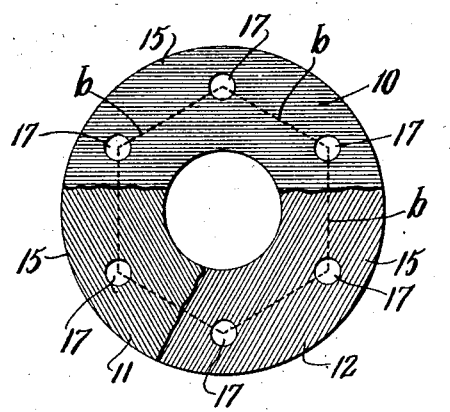

Each of the torque transmission discs illustrated in the drawing comprises a plurality of layers or laminæ 10, 11, 12, etc., composed of rubberized cords 15. The layers are vulcanized together so that there is a thickness of rubber insulation between the respective layers. The cords of each layer are parallel with one another and in order to facilitate manufacture a number of cords sufficient to make a disc of the desired dimension are lightly secured together, say, for example, at half inch intervals, by holding members 16, which, since they are not intended to sustain any stress in service, may be of temporary character, lasting only long enough to hold the cords in proper relation until the disc has been formed and vulcanized. As suitable material for such holding members, I mention light rubber or silk thread or threads composed of any other material which will dissipate or break down under the temperatures and pressures to which the discs are subjected in vulcanization.

Figure 4:
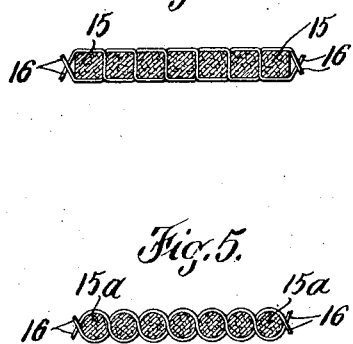
Fig. 4 shows a fragmentary cross section through a fabric layer or lamina suitable for a flexible member such as shown in one of the preceding figures.
Figure 5:
Fig. 5 shows a similar cross section of a somewhat differently constructed fabric layer.

The cords, preferably, are in contact with each other throughout their lengths and a cord of rectangular cross section such as indicated in Fig. 4 is most desirable as such construction provides a maximum area of contact with greater uniformity of friction between the cords of the layer. In addition, such a form of cord "lays up" better when holding members such as the members 16 are employed. In Fig. 5 the cords 15ª are of circular cross section.

Figure 2:
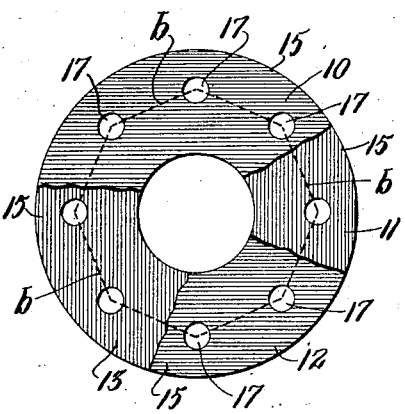
Figure 3:
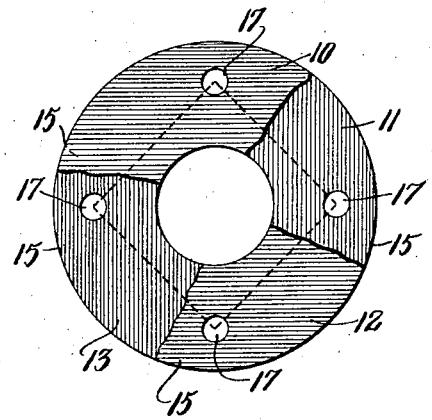

Fig. 1 shows a flexible member for a joint with a pair of three-arm spiders; Fig. 2 such a member for a joint with four-arm spiders; and Fig. 3 such a member for a joint with two-arm spiders. In each case it will be seen that there are a plurality of layers 10 etc., with their cords 15 all lying at substantial angles to one another; and the relative arrangement of the layers, and the location of the bolt holes 17 are such that in every layer the line of torque stress and strain $b$ running in a polygon from bolt hole to bolt hole lies at an angle to the cords 15 of that layer. While the angle between the stress and strain line $b$ and the cord direction in each layer 10 etc., necessarily varies around the polygon, yet as shown, the arrangement is such that in every layer the minimum angle (i. e., the angle at the side or sides of the stress and strain line polygon most nearly parallel with the cords 15) is as great as possible. In Fig. 1, this minimum angle is 30°; in Fig. 2, 22½°; in Fig. 3, 45°. As shown, the number of layers or laminæ 10 etc. is in every case such that an equal number of similar cords (the cords of an equal number of similar layers) extend in the same direction; thus in Fig. 1, there are three layers with their cords at 60° angles; and in Figs. 2 and 3, four layers each with the cords at 90° angles. Preferably, successive layers are regularly advanced or rotated relatively to one another by equal angles in the same direction, as shown.

The employment of single layers or laminæ whose strength element consists of cords all extending in one direction affords an important advantage over the employment of laminæ consisting of interwoven warps and wefts (usually at right angles to one another) both of which are relied on as strength members. In discs of laminated fabric, the direction of the strength threads or cords is not (as has been supposed) the direction of stress for which the disc develops its strength to best advantage, but, on the contrary, the direction for which it shows up the worst. For ordinary woven fabric, the direction of stress for best results is at 45° to both warps and wefts,—diagonally of the fabric, that is,—and as the angle of stress relatively to warps or wefts diminishes below 45°, the effective strength and endurance of the fabric diminish. If, then, such ordinary woven fabric were used in the disc of Fig. 1, for example, the direction of the wefts of each such layer (extending, as they would, at right angles to the cords 15 shown, which would then be ordinary warps) would exactly coincide with certain opposite sides of the stress and strain polygon; and for greatest strength it would then become necessary to shift the holes 17 so as to rotate the stress and strain polygon to a position where the minimum angle between its sides and the cords of such ordinary fabric would be 15°,—instead of 30°, as in the arrangement shown.

By my construction, the disc as a whole has marked elasticity in the direction of the pull and the elasticity of the various sections between bolt holes is substantially uniform. There is no direct pull parallel a set of cords and, therefore, in a direction in which there is least elasticity and, therefore, less strength. The tendency to separate the cords of a layer is resisted by the other layer or layers and by the friction between cords and the rubber.

It will be seen, therefore, that I have provided a disc of superior strength and greater endurance and one in which the flexure of the joint will not cause the cords to cut one another and wear through, as is the case with fabric, as above pointed out. Furthermore, the construction is one in which it is possible to obtain maximum strength with a minimum thickness of discs. By way of illustration, if the threads of the fabric ordinarily employed were increased in diameter, the thickness of each layer would be increased to a prohibitive point, whereas, by using cords and not woven fabric, cords of great diameter, comparatively speaking, can be employed without undue increase in thickness of the layers and, therefore, of the disc.

Figure 6:
Fig. 6 is a fragmentary cross section of another modification.

In the modification of Fig. 6 no cross holding members are provided, the cords $15^b$ being simply embedded as it were, in a sheet of rubber $15^c$ which has sufficient strength to hold together in sheet form during handling preparatory to vulcanization.

What I claim is:

1. A flexible torque transmitting disk comprised of cords or strength elements of a thickness approximately the thickness of the disk, and means effecting assemblage of the elements in disk form including tying threads.

2. A flexible torque transmitting disk comprised of cords or strength elements of a thickness approximately the thickness of the disk, and means effecting assemblage of the elements in disk form including tying threads and rubberizing material.

In testimony whereof, I have hereunto signed my name.

ANGUS S. MACDONALD.